(12) United States Patent
Hofmann et al.

(10) Patent No.: US 8,028,045 B2
(45) Date of Patent: *Sep. 27, 2011

(54) WEB-BASED CONFIGURATION SERVER FOR AUTOMATION SYSTEMS

(75) Inventors: Reinhard Hofmann, Vienna (AT); Alois Zoitl, Rohrbach (AT); Franz Johann Auinger, St. Pantaleon (AT); Kenwood H. Hall, Hudson, OH (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 573 days.

This patent is subject to a terminal disclaimer.

(21) Appl. No.: 11/536,878

(22) Filed: Sep. 29, 2006

(65) Prior Publication Data

US 2008/0082636 A1  Apr. 3, 2008

(51) Int. Cl.
G06F 15/16 (2006.01)
G06F 15/177 (2006.01)
(52) U.S. Cl. .................... 709/220; 709/203; 709/218
(58) Field of Classification Search .................. 709/220, 709/203, 218
See application file for complete search history.

(56) References Cited

U.S. PATENT DOCUMENTS

| | | | |
|---|---|---|---|
| 6,061,603 A | 5/2000 | Papadopoulos et al. | |
| 6,201,996 B1 | 3/2001 | Crater et al. | |
| 6,434,737 B1 | 8/2002 | Nishi | |
| 6,477,435 B1 | 11/2002 | Ryan et al. | |
| 6,865,429 B1 | 3/2005 | Schneider | |
| 7,017,116 B2 | 3/2006 | Elsbree et al. | |
| 7,035,898 B1* | 4/2006 | Baker ........................... | 709/203 |
| 7,054,922 B2 | 5/2006 | Kinney et al. | |
| 7,085,841 B2 | 8/2006 | Edwards et al. | |
| 7,165,226 B2 | 1/2007 | Thurner | |
| 7,181,515 B2* | 2/2007 | Lin et al. ....................... | 709/223 |
| 7,290,030 B2 | 10/2007 | Edwards | |

(Continued)

FOREIGN PATENT DOCUMENTS

JP    2004102586 A    4/2004
(Continued)

OTHER PUBLICATIONS

Lewis. "Modeling Control Systems Using IEC 61499" The Institute of Electrical Engineers, London 1998.

(Continued)

*Primary Examiner* — Wing F Chan
*Assistant Examiner* — David X Yi
(74) *Attorney, Agent, or Firm* — Turocy & Watson LLP; R. Scott Speroff; John M. Miller

(57) ABSTRACT

A configuration server provides a gateway for joining and exploring different networks to find and/or configure automation devices. The configuration server can be used for presentation and configuration interactions within a common web browser via, for example, a self-contained software application such as a configuration applet. The gateway can be based on open standards and implemented with small devices and/or with heterogeneous automation networks. The configuration server provides exploration of different network types and a list of attached devices to a configuration applet. The gateway enables links to automation devices to inspect their parameters and/or send configuration commands. In one instance, the configuration applet and the automation network devices are based on Java and IEC 61499, respectively. The configuration server can be utilized to discover both legacy and extended devices to help support manufacturing operators to easily maintain their automation systems.

22 Claims, 14 Drawing Sheets

U.S. PATENT DOCUMENTS

| | | | |
|---|---|---|---|
| 7,324,856 B1 | 1/2008 | Bromley | |
| 7,418,300 B2 | 8/2008 | Gikas et al. | |
| 7,555,706 B2 | 6/2009 | Chapman et al. | |
| 2001/0034852 A1* | 10/2001 | Kawashima | 714/4 |
| 2002/0152289 A1* | 10/2002 | Dube | 709/220 |
| 2003/0051074 A1 | 3/2003 | Edwards | |
| 2003/0084201 A1 | 5/2003 | Edwards et al. | |
| 2003/0093460 A1 | 5/2003 | Kinney et al. | |
| 2003/0165160 A1* | 9/2003 | Minami et al. | 370/466 |
| 2004/0210664 A1* | 10/2004 | Prendergast | 709/230 |
| 2005/0043620 A1* | 2/2005 | Fallows et al. | 600/437 |
| 2005/0155043 A1 | 7/2005 | Schulz et al. | |
| 2006/0190112 A1 | 8/2006 | Buesgen | |
| 2006/0209868 A1* | 9/2006 | Callaghan | 370/428 |
| 2007/0168060 A1 | 7/2007 | Nixon et al. | |
| 2008/0080543 A1* | 4/2008 | Hickox et al. | 370/419 |

FOREIGN PATENT DOCUMENTS

| | | |
|---|---|---|
| WO | 9853581 A | 11/1998 |
| WO | 9853581 A1 | 11/1998 |
| WO | 0195041 | 12/2001 |
| WO | 03079126 A | 9/2003 |
| WO | 2004086160 | 10/2004 |

OTHER PUBLICATIONS

Tanenbaum, et al. "Distributed Systems. Principles and Paradigms" Second Ed. Pearson Prentice Hall, Upper Saddle River, New Jersey, 2007.
OA mailed Mar. 17, 2009 for U.S. Appl. No. 11/427,436, 21 pages.
OA mailed Mar. 25, 2009 for U.S. Appl. No. 11/427,423, 25 pages.
T. Lump, et al., "Virtual Java devices. Integration of fieldbus based systems in the Internet" Industrial Electronics Society, 1998. IECON '98. Proceedings of the 24th Annual Conference of the IEEE Aachen, Germany Aug. 31-Sep. 4, 1998, New York, NY, USA, IEEE, US, vol. 1, Aug. 31, 1998, pp. 176-181.
European Search Report dated Feb. 27, 2008 for European Patent Application Serial No. EP 07 11 5135, 1 Page.
Thramboulidis, et al. "An Architecture for the Development of Function Block Oriented Engineering Support Systems" (2001) IEEE International Symposium on Computational Intelligence in Robotics and Automation, 10 pages.
Thramboulidis, et al. "Field Device Specification for the Development of Function Block Oriented Engineering Support Systems" (2001) IEEE Conference on Emerging Technology and Factory Automation, 7 pages.
Thramboulidis, et al. "Using UML for the Development of Distributed Industrial Process Measurement and Control Systems" (2001) IEEE International Conference on Control Applications, 6 pages.
Thramboulidis, et al. "Developing a CASE tool for Distributed Control Applications" (2004) International Journal of Advanced Manufacturing Technology, 12 pages.
Thramboulidis, et al. "Development of Distributed Industrial Control Applications: The CORFU Framework" (2002) 4th IEEE International Workshop on Factory Communication Systems, 8 pages.
Thramboulidis, et al. "An IEC-compliant Engineering Tool for Distributed Control Applications, A White Paper" (2003) Electrical & Computer Engineering, 6 pages.
WEC The World Wide Web Consortium Hyper Text Markup Language (HTML) Home Page http://www.w3c.org/MarkUp/ last viewed Nov. 6, 2006, 15 pages.
WEC The World Wide Web Consortium HTTP—Hyper Text Transfer Protocol http://www.w3c.org/Protocols/#Specs last viewed Nov. 6, 2006, 63 pages.
Net Beans: Main Page, NetBeans IDE 3.6 (4.0) http://www.netbeans. org last viewed Nov. 6, 2006, 4 pages.
Net Beans: Documentation and Support http://netbeans.org/kb/index.html last viewed Nov. 6, 2006, 2 pages.
Net Beans: Getting Started with the NetBeans Open APIs http://openide.netbeans.org/source/browse/checkout/openide/api/doc/tutorial/index.html last viewed Nov. 6, 2006, 1 page.
Net Beans: The Definitive Guide http://netbeans.org/kb/index.html last viewed Nov. 3, 2006, 2 pages.
Eclipse Corner: Eclipse Main Page; Eclipse SDK 3.0 http://www.eclipse.org last viewed on Nov. 6, 2006, 2 pages.
Eclipse Corner: Technical Articles http://www.eclipse.org/articles/index.html last viewed Nov. 6, 2006, 2 pages.
Sun Microsystems Java http://www.java.sun.com last viewed Nov. 3, 2006, 2 pages.
WEBIEC International Electrotechnical Comission IEC 61499 http://java.sun.com/docs/books/tutorial/jar/index,html last viewed Nov. 6, 2006, 61 pages.
Ernestus. "Mit Webstandards bis an die Klemme" IEEE (2003) Huthig, Heidelberg, 14 pages.
IDS Group. "IDA White Paper v1.0, Interface for Distributed Automation" (2001) IDS Group pp. 515-518.
HMSC "The Holonic Manufacturing Systems Consortium" IEC 61499 Compliance Profile for Feasibility Demonstrations http://www.holobloc.com/doc/ita/index.htm last viewed Nov. 6, 2006, 1 page.
Sun. The Source for Developers. The Java 1.4.2 API Specification http://java.sun.com.j2se/1.4.2/docs/api/ last viewed Nov. 6, 2006, 10 pages.
Fernig, et al. "Towards Distributed Configuration" (2001) Joint German/Austrian Conference on AI, vol. 2174, 15 pages.
Graupner, et al. "Configuration, Simulation and Animation of Manufacturing Systems via the Internet" (2002) Proceedings of the Simulation Conference, 7 pages.
OA Dated Oct. 15, 2008 for U.S. Appl. No. 11/427,423, 18 pages.
OA Dated Sep. 10, 2008 for U.S. Appl. No. 11/427,436, 18 pages.
OA Dated May 14, 2009 for U.S. Appl. No. 11/536,898, 42 pages.
OA dated Aug. 26, 2009 for U.S. Appl. No. 11/427,423, 36 pages.
OA dated Jul. 24, 2009 for U.S. Appl. No. 11/427,436, 26 pages.
OA dated Nov. 17, 2009 for U.S. Appl. No. 11/536,898, 42 pages.
European Search Report dated Dec. 27, 2007 for European Application Serial No. 07012540.6, 6 pages.
OA dated Mar. 26, 2010 for U.S. Appl. No. 11/427,423, 30 pages.
OA dated Apr. 7, 2010 for U.S. Appl. No. 11/427,436, 29 pages.
OA dated Aug. 25, 2010 for U.S. Appl. No. 11/427,423, 41 pages.
OA dated Jul. 14, 2010 for U.S. Appl. No. 11/536,898, 42 pages.
OA dated Oct. 6, 2010 for U.S. Appl. No. 11/427,436, 29 pages.
EP Search Report dated Oct. 22, 2010 for European Application No. 07115098.1-2206 / 1906274, 8 pages.
Thramboulidis, et al., An Architecture for the Development of Function Block Oriented Engineering Support Systems. Proceedings of 2001 International Symposium on Computational Intelligence in Robotics and Automation. Jan. 1, 2001, XP002603549. URL: http://ieeexplore.ieee.org/xpls/abs_all.jsp?arnumber=1013258&tag=1. Last accessed Nov. 2, 2010, 8 pages.
OA dated Dec. 27, 2010 for U.S. Appl. No. 11/536,898, 55 pages.
OA dated Apr. 1, 2011 for U.S. Appl. No. 11/427,436, 38 pages.

* cited by examiner

WEB-BASED CONFIGURATION SERVER FOR AUTOMATION SYSTEMS

RELATED APPLICATIONS

This application is related to co-pending and co-assigned U.S. applications entitled "HMI FRAMEWORK FOR EXTENSIBLE AUTOMATION SYSTEM ENGINEERING PLATFORMS," client reference 06AB124, filed on Jun. 29, 2006 and assigned Ser. No. 11/427,423; "AUTOMATION HMI VISUALIZATION UTILIZING GUI FUNCTION BLOCK," client reference 06AB126, filed on Jun. 29, 2006 and assigned Ser. No. 11/427,436; and "WEB-BASED CONFIGURATION OF DISTRIBUTED AUTOMATION SYSTEMS," client reference 06AB127, filed on Sep. 29, 2006 and assigned Ser. No. 11/536,898 and are incorporated herein by reference.

BACKGROUND

Modern automation typically consists of distributed systems that are often quite complex. This creates an additional burden on system engineers who must change production processes to meet ever changing manufacturing guidelines. These changing guidelines are frequently caused by rapid changes in markets that make great demands on the flexibility of the manufacturing systems. In these situations, progressive automation helps to further improve productivity, while preserving reliability and product quality. But the automation evolution continuously requires more logic and processing capabilities from production lines. The control systems, therefore, must also continuously grow in size and complexity. To keep the designs flexible and manageable, the intelligence is often distributed into so-called smart devices, for example, directly into sensors and actuators.

Distributed systems allow controlling algorithms to be split into ever smaller and simpler parts, with components that can be inexpensively reused for other tasks. Sensor data can now be processed within the smart devices themselves instead of transferring it to a central controlling unit. This may also help reduce real-time communications between the automation devices, allowing further advancements in the automation processes. But the ever increasing complexity of distributed automation, also increases the level of sophistication required to configure the processes, often beyond the capabilities of lesser skilled operators.

SUMMARY

A configuration server provides a gateway for joining and exploring different networks to identify and/or configure automation devices. The configuration server can be utilized for presentation and configuration interactions within a common web browser via, for example, a self-contained software application such as a configuration applet. The gateway can be based on open standards and implemented with small devices and/or with heterogeneous automation networks. The configuration server can explore different types of networks and provide a list of attached devices to a configuration applet residing on a workstation (e.g., a PC with a browser). The gateway enables links to automation devices to inspect their parameters and/or send configuration commands. In one instance, the configuration applet and the automation network devices are based on Java and IEC 61499, respectively. The configuration server can be utilized to discover both legacy and/or extended devices to help support manufacturing operators to easily maintain their ever expanding automation systems.

The above presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

To the accomplishment of the foregoing and related ends, certain illustrative aspects of embodiments are described herein in connection with the following description and the annexed drawings. These aspects are indicative, however, of but a few of the various ways in which the principles of the subject matter may be employed, and the subject matter is intended to include all such aspects and their equivalents. Other advantages and novel features of the subject matter may become apparent from the following detailed description when considered in conjunction with the drawings.

DETAILED DESCRIPTION

Figure 1:
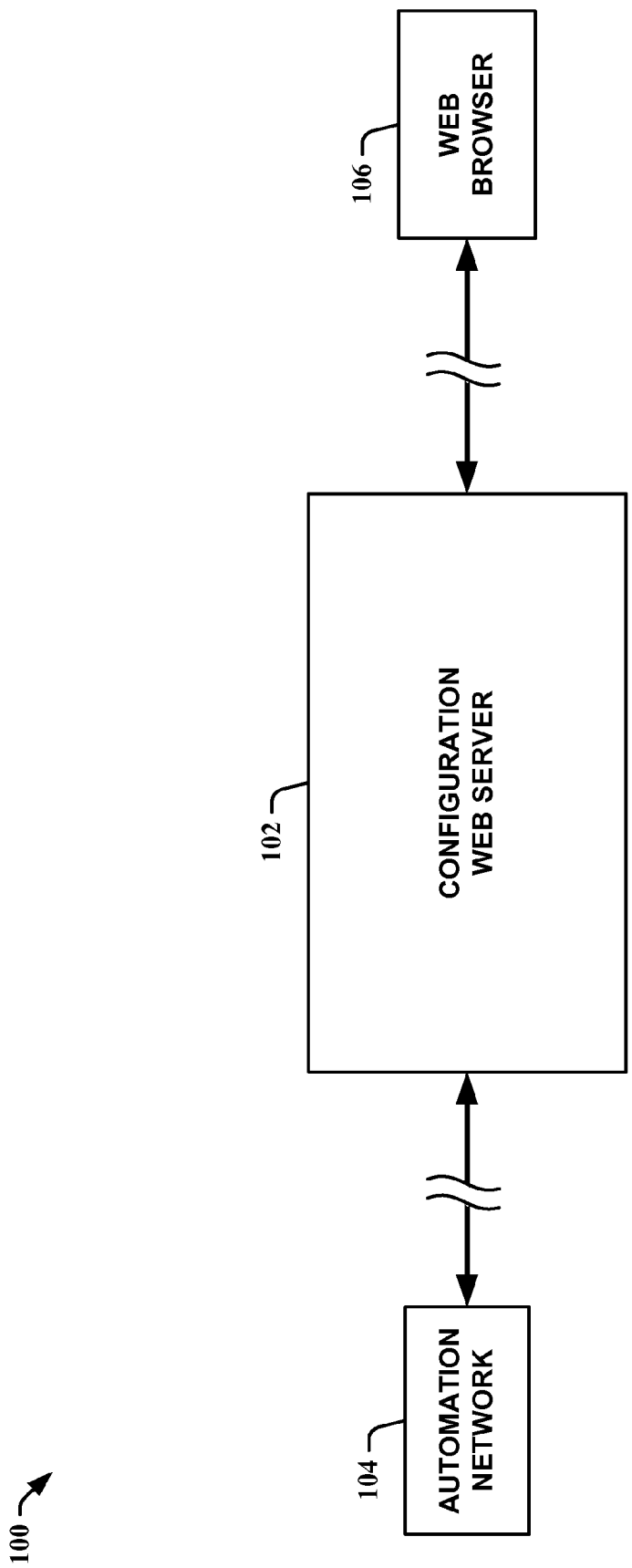
FIG. 1 is a block diagram of an automation configuration system in accordance with an aspect of an embodiment.

The subject matter is now described with reference to the drawings, wherein like reference numerals are used to refer to like elements throughout. In the following description, for purposes of explanation, numerous specific details are set forth in order to provide a thorough understanding of the subject matter. It may be evident, however, that subject matter embodiments may be practiced without these specific details. In other instances, well-known structures and devices are shown in block diagram form in order to facilitate describing the embodiments.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers.

Furthermore, the subject matter may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope or spirit of the subject matter.

Instances of a configuration web server are provided that allow exploration of different automation network types and/or determination of listings of attached automation devices to a web browser-based configuration interface. The configuration web server utilizes a configuration gateway that enables links to these devices to inspect their parameters and/or send configuration commands. In one instance, the configuration interface and the configuration web server are based on a Java applet and International Electrotechnical Commission (IEC) 61499. This provides significant advantages because modern automation systems are frequently made up of 'smart' devices that can be identified, configured and/or programmed from a centralized source. These intelligent sensors and actuators can autonomously control parts of the process on the spot. But to program the whole system, its complex algorithm has to be split up and distributed into these devices.

By utilizing an open standard such as, for example, IEC 61499, a scalable architecture can be provided to model applications for such distributed control systems. It allows a clear overview of the entire system by encapsulating the functionality within modules that are called 'function blocks.' To configure the devices of such an IEC 61499 architecture, an instance of a configuration web server provided herein can allow convenient access to an automation network from any desktop computer. This provides remote configuration of automation devices and changing parameters even while a manufacturing plant is operating. The configuration web server can also utilize existing communication means such as, for example, the Internet. The Internet provides global connections that can be utilized to contact the automation network. Similarly, the configuration interface can use traditional technologies to allow compatibility with common computer systems. Thus, for example, Java applets (i.e., self-contained software applications) can be used for these platform-independent operations with most web browsers.

FIG. 1 shows a block diagram of an automation configuration system 100 that employs a configuration web server 102 which interacts with an automation network 104 and a web browser 106 via a communication means such as, for example, the Internet and/or an Intranet and the like. The communication means can be wired and/or wireless. The automation network 104 is comprised of automation devices that can be standardized to a given engineering platform such as, for example, IEC 61499 and the like and/or non-standardized (e.g., simple, legacy devices). The configuration web server 102 can explore the automation network 104 and, when present, establish a link to configurable devices. Since the automation devices can be disparate and utilize basic and/or complex communication protocols, the configuration web server 102 employs various means (described infra) to identify the automation devices. In one instance, the configuration web server 102 can even download an identification resource to automation devices that are compatible with an engineering standard to assist the identification process.

To facilitate configuration of the automation network 104, the configuration web server 102 interacts with the web browser 106 which can reside in a remote location on a computing device such as, for example, on a desktop PC and/or a laptop and the like. The configuration web server 102 provides a hypertext markup language (HTML) web page to the computing device from which a user can select to run a self-contained software application (e.g., Java applet and the like) from within the web browser 106. The configuration web server 102 then establishes a communication link with the self-contained software application to enable it to communicate with automation devices on the automation network 104. The automation devices can then be configured remotely with the self-contained software application via the configuration web server 102. Thus, the configuration web server 102 allows disparate, distributed automation devices on the automation network 104 to be remotely configurable with a computing device that supports web communications such as hypertext transport protocol (HTTP) and the like. This enables users to easily configure remote devices with common software interfaces that they are familiar with, substantially reducing the skill levels required to configure the automation network 104.

Figure 2:
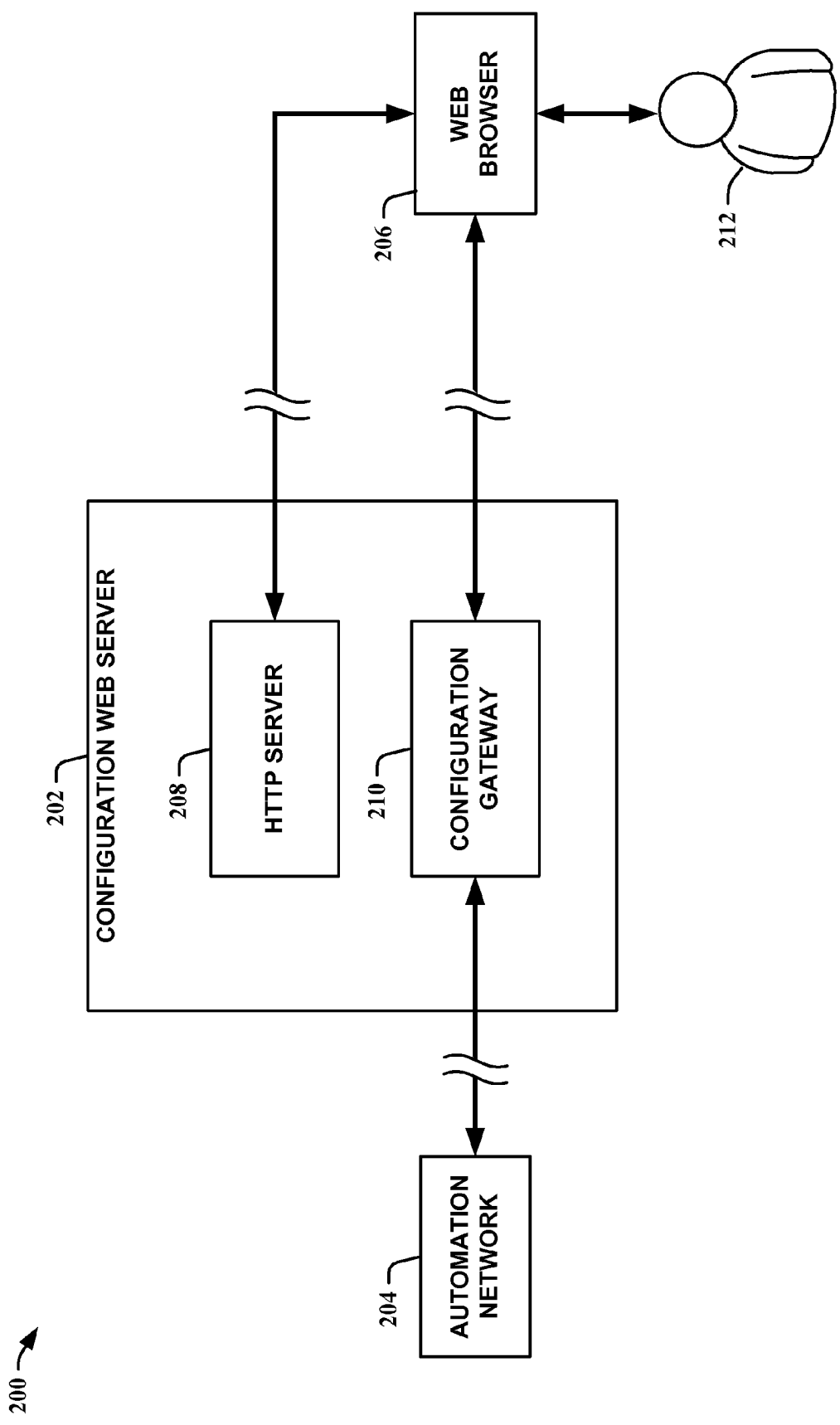
FIG. 2 is another block diagram of an automation configuration system in accordance with an aspect of an embodiment.

Another automation configuration system 200 is illustrated in FIG. 2. The automation configuration system 200 utilizes a configuration web server 202 to interact with an automation network 204 and a web browser 206. The configuration web server 202 employs a hypertext transfer protocol (HTTP) server 208 to provide a web page and/or self-contained software application and the like to the web browser 206. The HTTP server 208 can provide secure, HTTPS, communications and/or non-secure, HTTP, communications with the web browser 206. The configuration web server 202 also utilizes a configuration gateway 210 to explore the automation network 204 to discover automation devices and/or to provide a communication link between the automation devices and the web browser 206. Typically, a user 212 uses a computing device that contains the web browser 206 to access a web page provided by the HTTP server 208. From this web page, the user 212 initiates a self-contained software application that runs within the web browser 206. By utilizing this self-contained software application, the user 212 can find and/or configure devices on the automation network 204 via the configuration gateway 210.

The configuration gateway 210 provides communication links to standardized and/or non-standardized automation devices so that the user 212 can configure them. In most instances, the configuration gateway 210 provides an exploration functionality that can detect automation devices and also a communication functionality that allows communication with the detected devices. Since automation devices can be disparate, the configuration gateway 210 employs various means (described infra) to discover and/or communicate with the automation devices. This allows the configuration gateway 210 to interact with both smart devices and legacy devices with limited capabilities.

Figure 3:
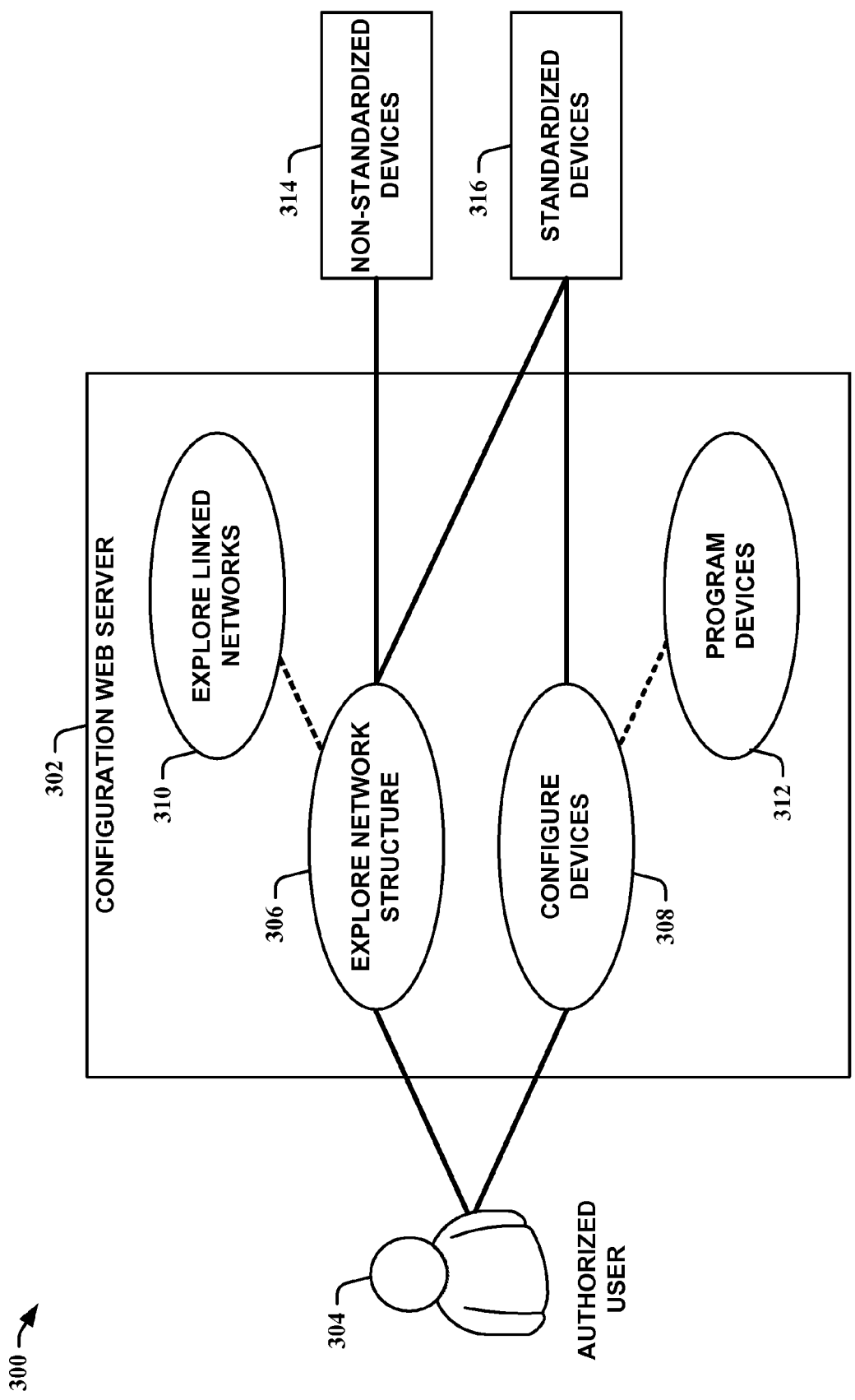
FIG. 3 is an illustration of functionality of an automation configuration system in accordance with an aspect of an embodiment.

FIG. 3 provides an overview of some of the functionality provided by an automation configuration system 300. In this instance, the automation configuration system 300 utilizes a configuration web server 302 to interact with an authorized user 304 to communicate and/or configure non-standardized devices 314 and standardized devices 316. The configuration web server 302 provides the authorized user 304 with a means to explore a network's structure to locate automation devices. In this example, the authorized user 304 explores the network structure and locates the non-standardized devices 314 and the standardized devices 316. Other instances can employ multiple configuration gateways to allow access to other automation networks so that those linked networks can also be explored 310. When the devices 314, 316 have been discovered, the authorized user 304 can then configure compatible devices 308 via the configuration web server 302.

Typically, non-standardized devices 314 cannot be configured remotely due to their limited remote configuration capabilities. Thus, in this example, the authorized user 304 can only configure the standardized devices 316 via the configuration web server 302. In some instances, the standardized devices 316 can be programmable as well and, thus, the configuration web server 302 can also be utilized to program devices 312. The authorized user 304 is afforded substantial centralized control over an automation network because the configuration web server 302 can provide optimum control over automation devices based on their level of sophistication, allowing compatibility with state-of-the-art devices as well as legacy devices.

Figure 4:
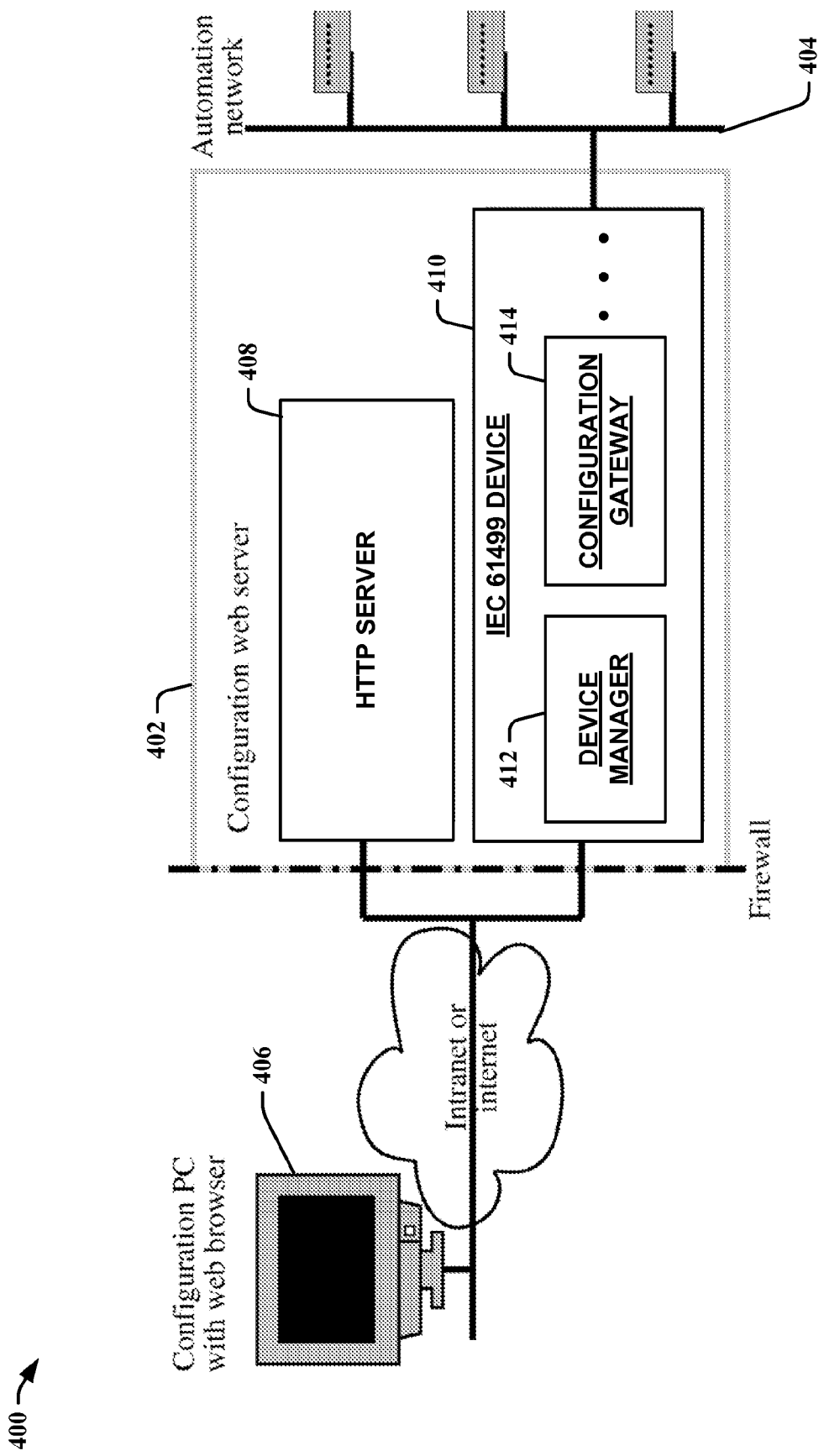
FIG. 4 is an example of an IEC 61499 compliant, automation configuration system in an extensible engineering environment in accordance with an aspect of an embodiment.

An instance that employs an IEC 61499 compliant, automation configuration system 400 is shown in FIG. 4. The automation configuration system 400 utilizes a configuration web server 402 to establish an interconnection between an automation network 404 and a configuration PC with web browser 406. The configuration web server 402 employs an HTTP server 408 to provide a configuration HTML page to the configuration PC with web browser 406. The configuration PC with web browser 406 can then launch a self-contained software application from within the web page to facilitate in configuring devices in the automation network 404.

The configuration web server 402 utilizes an IEC 61499 device 410 with a device manager 412 and a configuration gateway 414 to provide links to the automation devices in the automation network 404. The configuration web server 402 provides a separate configuration gateway 414 for each instantiation of the self-contained software application operating on the configuration PC with web browser 406. Communications between the configuration web server 402 and the configuration PC with web browser 406 can be, for example, the Internet and/or an intranet and the like. Communications between the configuration web server 402 and the automation network 404 can also be, for example, the Internet and/or an intranet and the like. Proprietary buses can also be utilized to connect the automation network 404 to the configuration web server 402.

The concept of web interaction is based on the HTTP server 408 providing the starting HTML page to the user's web browser. The self-contained software application or configuration applet, for example, is referenced from the HTML page for download and execution without difficult user interactions. Additional parameters can be provided to the applet via the HTML page like, for example, special server access information. The HTTP server 408 can also be utilized for first contact. Once the client PC executes the applet, it connects to the configuration gateway 414 that is contained in the configuration web server 402. User interaction can then be handled by the configuration gateway 414. The configuration web server 402 can then explore the connected automation network topology and additionally linked networks. The configuration web server 402 can also provide generic facilities to configure and/or program standard devices such as, for example, IEC 61499 compliant devices.

The configuration web server 402 is connected to an intranet or the Internet to supply information to a user of the configuration PC with web browser 406. It can also be attached to the automation network 404 by an optional separate network interface. This structure makes it possible to provide configuration functions for the network topology. A second network interface prevents direct access from the configuration PC with web browser 406. Thus, the user has to pass through the configuration gateway 414, where a firewall or security layer with user authentication can be implemented to restrict access.

Figure 5:
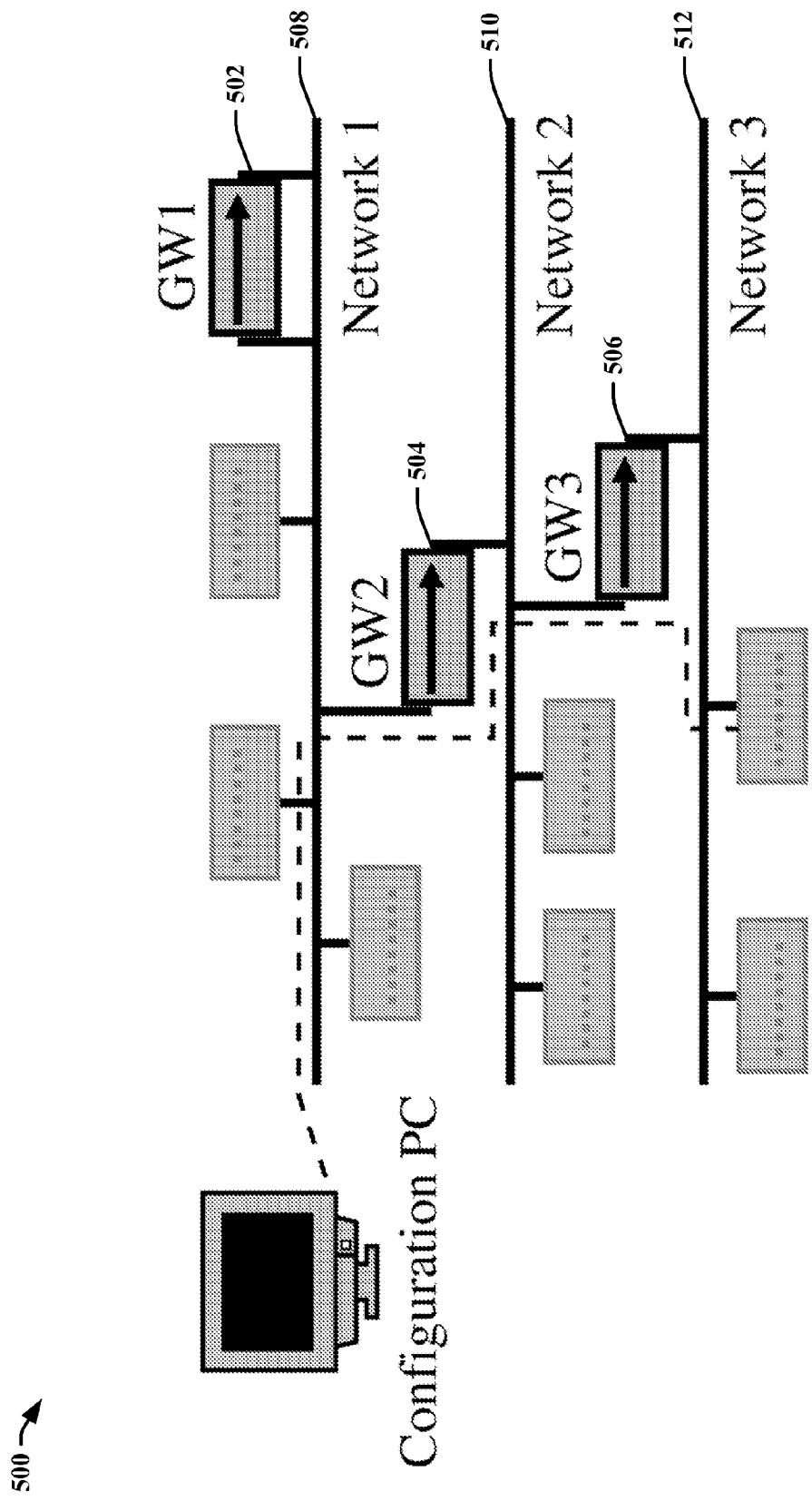
FIG. 5 is an illustration of an automation configuration system interconnected with multiple automation networks in accordance with an aspect of an embodiment.

It is also possible to use multiple configuration gateways 502-506 for deeper connections into a hierarchical or interconnected network topology 500 as illustrated in FIG. 5. Each sub-net can be linked by an additional instance of a gateway (GW). For example, GW 1 502 can be asked to gather available devices on Network 1 508. The client can then use GW 2 504 to search for gateways which are accessing Network 3 512. Finally, the actual message can pass to a target component via GW 2 504 and GW 3 506. It is not necessary to create gateway instances statically. This allows connections to be made to new networks on demand. Additionally, dynamic instantiation enables concurrent access, by creating parallel connections between the same networks. This makes it possible for multiple clients to communicate with target devices at the same time.

Figure 6:
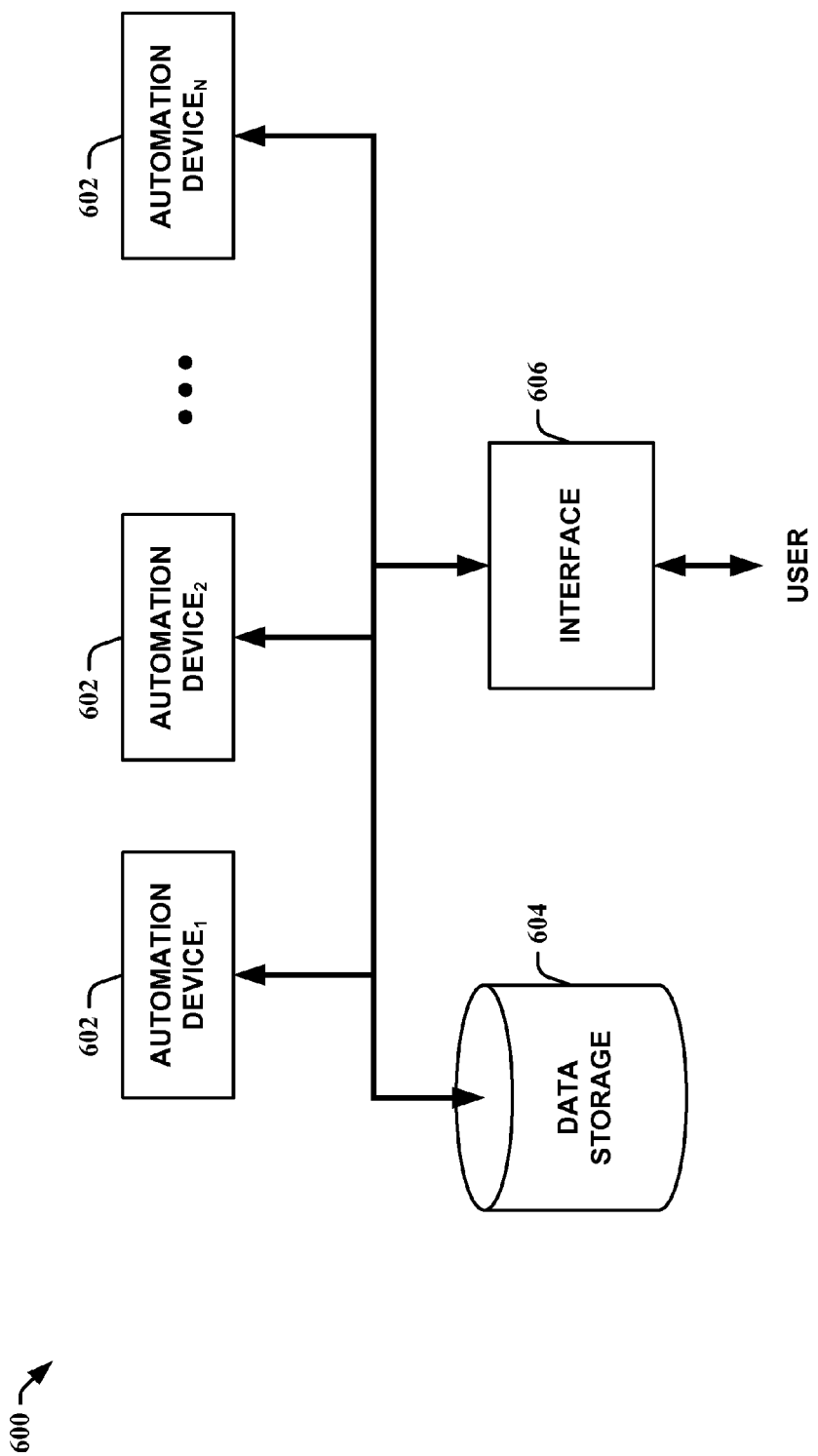
FIG. 6 is a block diagram of an automation system in accordance with an aspect of an embodiment.

The above systems are utilized to configure automation systems. FIG. 6 illustrates a typical automation system 600 for reference. The automation system 600 is comprised of one or more automation device(s) 602 (AUTOMATION DEVICE$_1$ through AUTOMATION DEVICE$_N$, where N is an integer from one to infinity), data storage 604 and interface 606. Automation device(s) 602 can include any one of a plurality of industrial, commercial and/or entertainment processes and machines such as programmable logic controllers (PLCs), pumps providing fluid transport and other processes, fans, conveyor systems, compressors, gear boxes, motion control and detection devices, sensors, screw pumps, and mixers, as well as hydraulic and pneumatic machines driven by motors. Such motors can be combined with other components, such as valves, pumps, furnaces, heaters, chillers, conveyor rollers, fans, compressors, gearboxes, and the like, as well as with appropriate motor drives to form industrial machines and actuators. For example, an electric motor could be combined with a motor drive providing variable electrical power to the motor, as well as with a pump, whereby the motor rotates the pump shaft to create a controllable pumping system.

Data storage 604 provides a storage location for housing data relating to automation device(s) 602 including but not limited to device description, location, and mechanical condition, energy or fuel consumption, completed cycles, horsepower, average RPM, efficiency rating, as well as data from sensors regarding device health and/or performance. The data storage 604 can be integrated or federated and linked by a communication system. Interface 606 is operable to connect users with a network of automation devices 602 and/or data storage 604 via a wire (e.g., twisted pair, coaxial cable, optical fiber, Ethernet, USB (Universal Serial Bus), FireWire) or wirelessly (e.g., using IEEE 802.11a and/or IEEE 802.11b standards, Bluetooth technology, satellite). Interface 606 facilitates monitoring, extracting, transmitting, and otherwise interacting with automation device(s) 602 and associated data.

As shown in FIG. 6, a user such as, for example, a device operator can connect to data storage 604 and automation devices 602 over a local area network (LAN) utilizing a variety of LAN technologies, including Fiber Distributed Data Interface (FDDI), Copper Distributed Data Interface (CDDI), Ethernet/IEEE 802.3, Token Ring/IEEE 802.5, physical connection topologies such as bus, tree, ring, and star, and the like. However, communications between networked devices such as automation devices 602, data storage 604, and interface 606 need not be limited to those devices connected locally to a network. Local networked devices can also communicate to and from remote devices.

Figure 7:
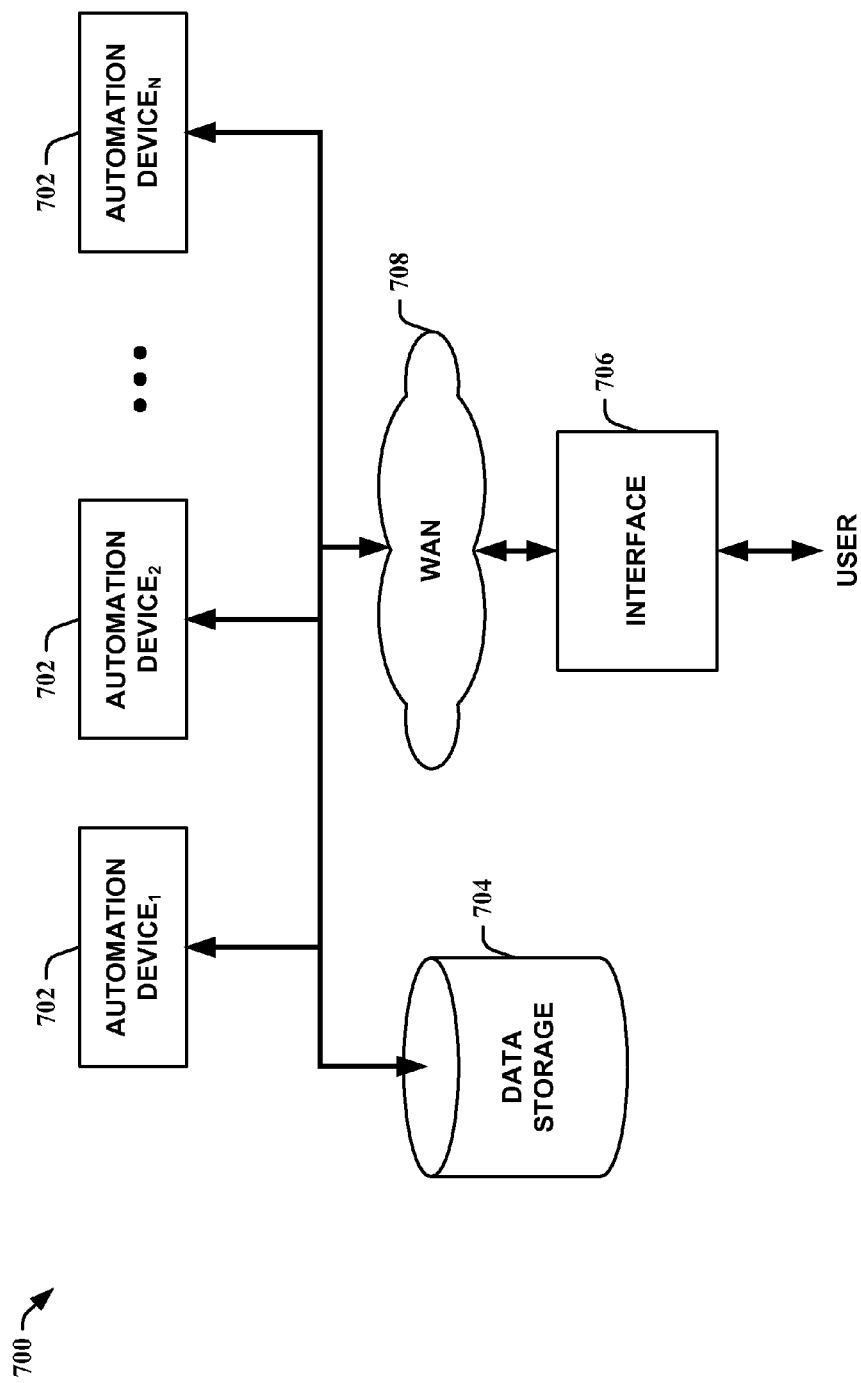
FIG. 7 is another block diagram of an automation system in accordance with an aspect of an embodiment.

FIG. 7 is substantially the same as system 600 except that a user employs interface 706 to interact with automation devices 702 and data storage 704 remotely over a wide area network (WAN) 708. WANs 708 are communication networks that span a large geographic area (e.g., nationwide, worldwide) and generally consist of the several interconnected local area networks (LANs) and metropolitan area networks (MANs). The largest WAN 708 in existence today is the Internet. WAN technologies include, but are not limited to, point-to-point links, circuit switching networks like Integrated Services Digital Networks (ISDN) and variations thereon, packet switching networks, TI networks, and Digital Subscriber Lines (DSL).

In view of the exemplary systems shown and described above, methodologies that may be implemented in accordance with the embodiments will be better appreciated with reference to the flow charts of FIGS. 8-12. While, for purposes of simplicity of explanation, the methodologies are shown and described as a series of blocks, it is to be understood and appreciated that the embodiments are not limited by the order of the blocks, as some blocks may, in accordance with an embodiment, occur in different orders and/or concurrently with other blocks from that shown and described herein. Moreover, not all illustrated blocks may be required to implement the methodologies in accordance with the embodiments.

The embodiments may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired in various instances of the embodiments.

Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, carrier, or media.

Figure 8:
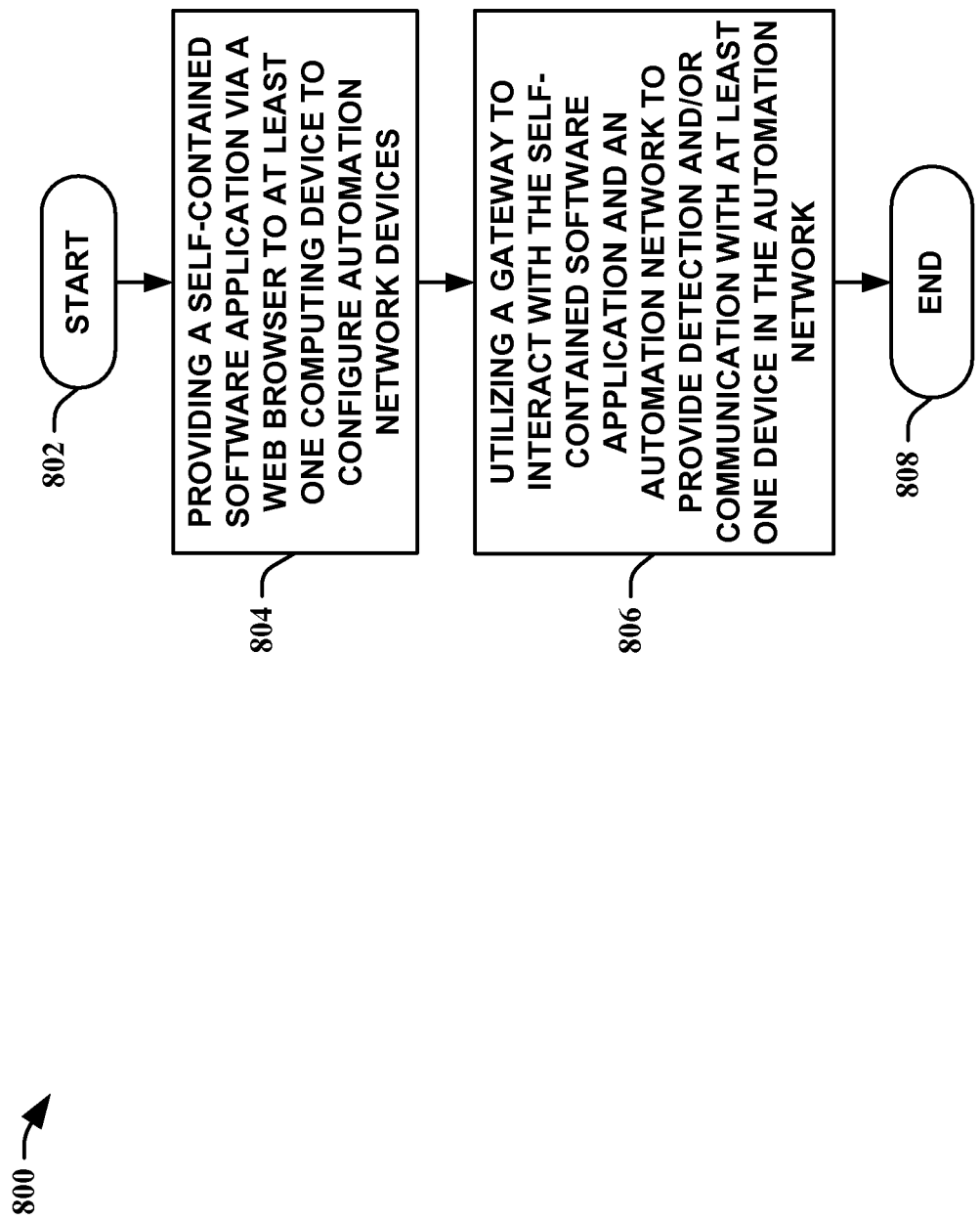
FIG. 8 is a flow diagram of a method of configuring an automation system in accordance with an aspect of an embodiment.

In FIG. 8, a flow diagram of a method 800 of configuring an automation system in accordance with an aspect of an embodiment is shown. The method 800 starts 802 by providing a self-contained software application via a web browser to at least one computing device to configure automation network devices 804. The self-contained software application can include, but is not limited to, Java applets and the like utilized to form a configuration applet that executes on the web browser. Typically, a user initiates the process by utilizing a web browser to request an HTML page from an HTTP server. The self-contained software application is then typically initiated by the user from the HTML page. A gateway is utilized to interact with the self-contained software application and an automation network to provide detection and/or communication with at least one device in the automation network 806, ending the flow 808. Communication between the self-contained software application and the automation network can be utilized to configure automation devices. This can include communication with standardized automation devices and/or non-standardized automation devices. Some instances are based on IEC 61499 standards. The gateway provides a single entry point for communications between a user and the automation devices, increasing security between a user's system and an automation network while providing centralized configuration capabilities.

Figure 9:
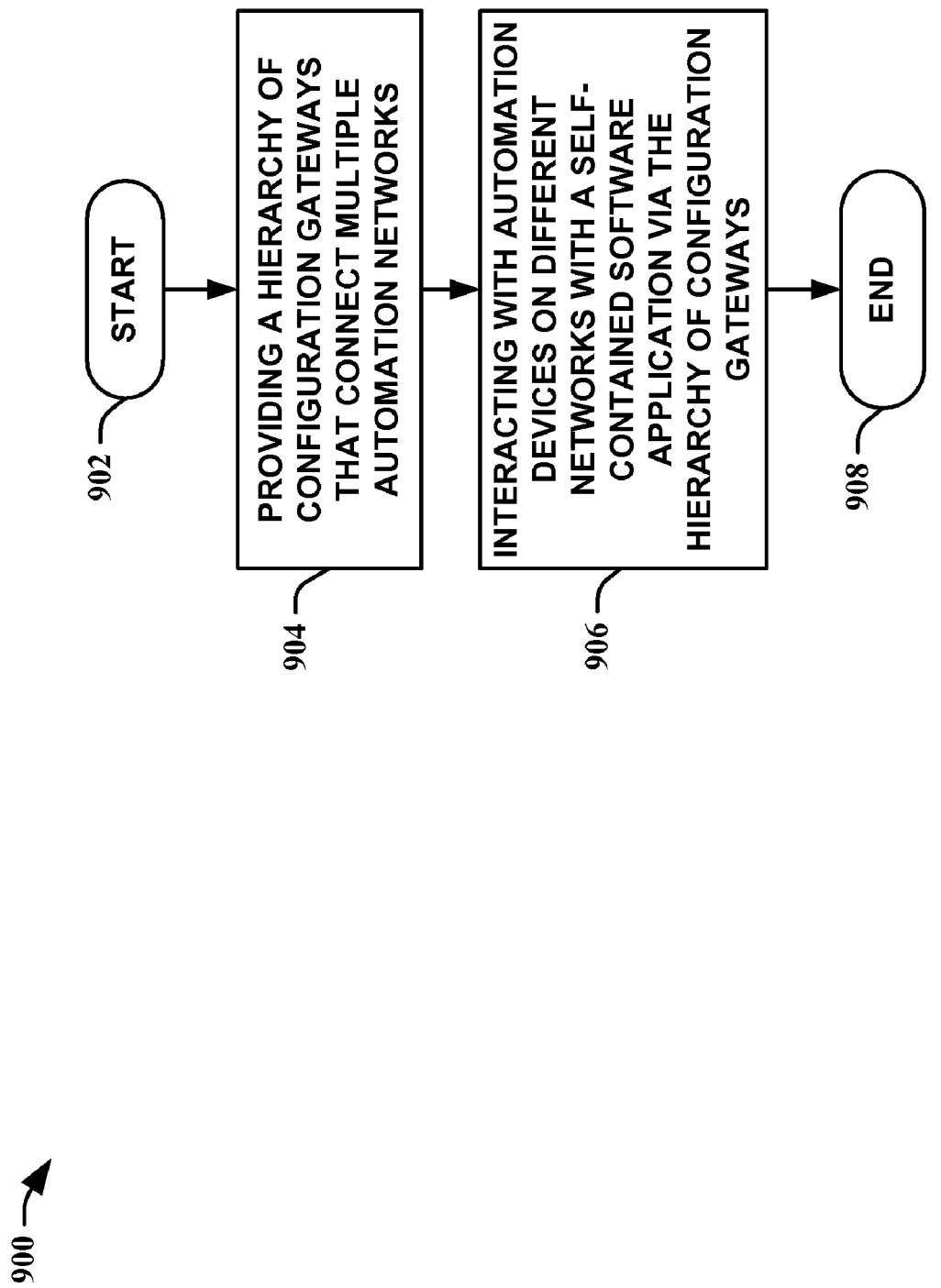
FIG. 9 is a flow diagram of a method of configuring an automation system with multiple automation networks in accordance with an aspect of an embodiment.

Looking at FIG. 9, a flow diagram of a method 900 of configuring an automation system with multiple automation networks in accordance with an aspect of an embodiment is depicted. The method 900 starts 902 by providing a hierarchy of configuration gateways that connect multiple automation networks 904. The gateways provide a pathway for communications between the networks. These pathways can be secure if necessary. Automation devices on different networks are interacted with a self-contained software application via the hierarchy of configuration gateways 906, ending the flow 908. The configuration gateways provide paths between the networks so that the self-contained software application which typically resides on a computing device can access the remote automation devices, regardless in which network they reside. Multiple hierarchies of gateways can be utilized to provide parallel communications between networks for multiple self-contained software applications.

Figure 10:
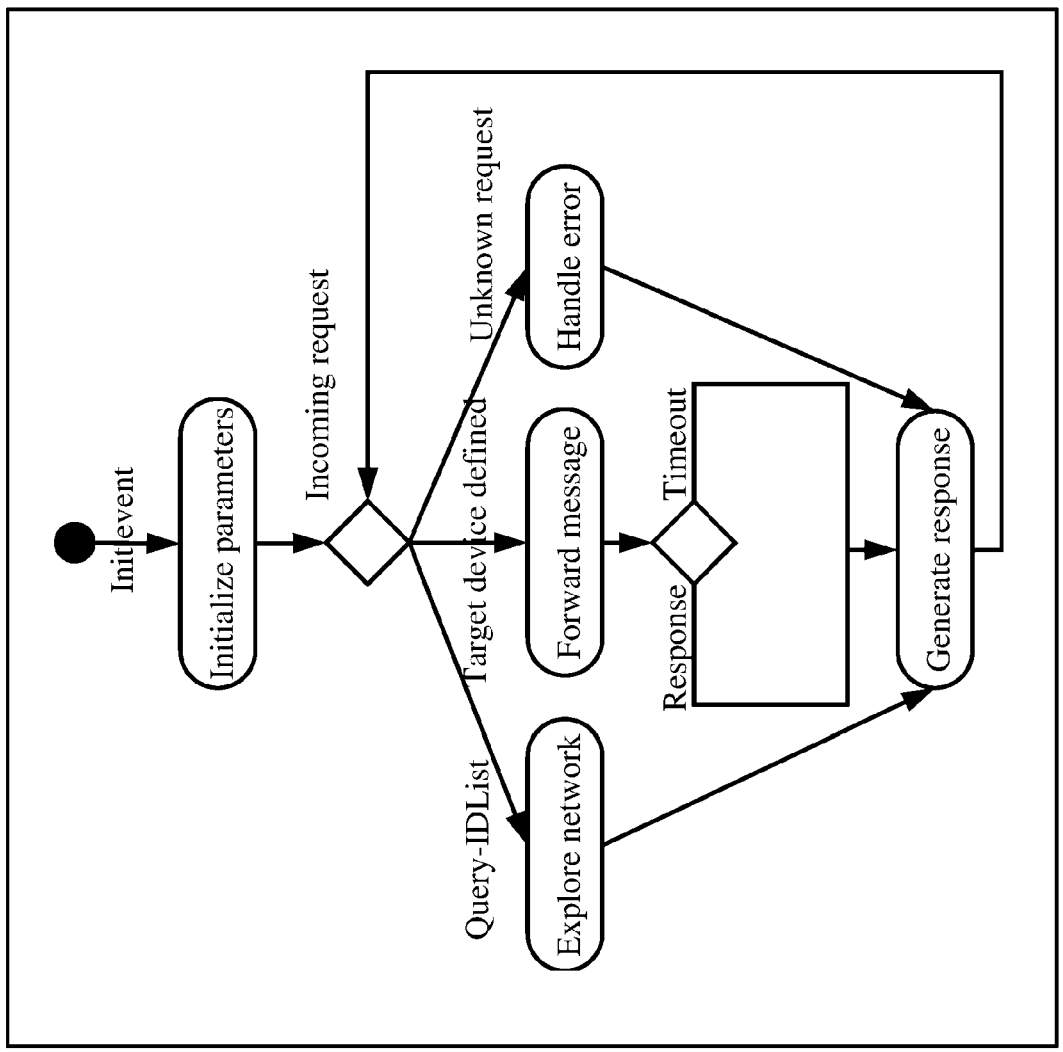
FIG. 10 is an activity process flow for a configuration gateway in accordance with an aspect of an embodiment.

FIG. 10 illustrates an activity process flow 1000 for a configuration gateway. The configuration gateway forms an interlinking connection between two networks. Therefore, it typically utilizes two Network Interface Cards (NICs)—one for receiving requests and the other to access a secondary network. Thus, the configuration gateway is unidirectional. To share the networks in both ways, another gateway can be implemented in an anti-parallel direction. The configuration gateway offers its functionality as a service, which utilizes client/server-structures. Because this technology is available in most network protocols, it is not encapsulated within a more specific exploration function block of an IEC 61499 based system. But in some field bus systems, the configuration gateway must fill an exceptional position to provide this service. For example, in a master/slave-architecture, it will have to act as master. The configuration gateway can also be connected with 'both ends' to the same network, using the only NIC as a secondary interface. This is useful for utilizing an exploration routine. The detected devices can then be accessed directly by the configuration applet.

Figure 11:
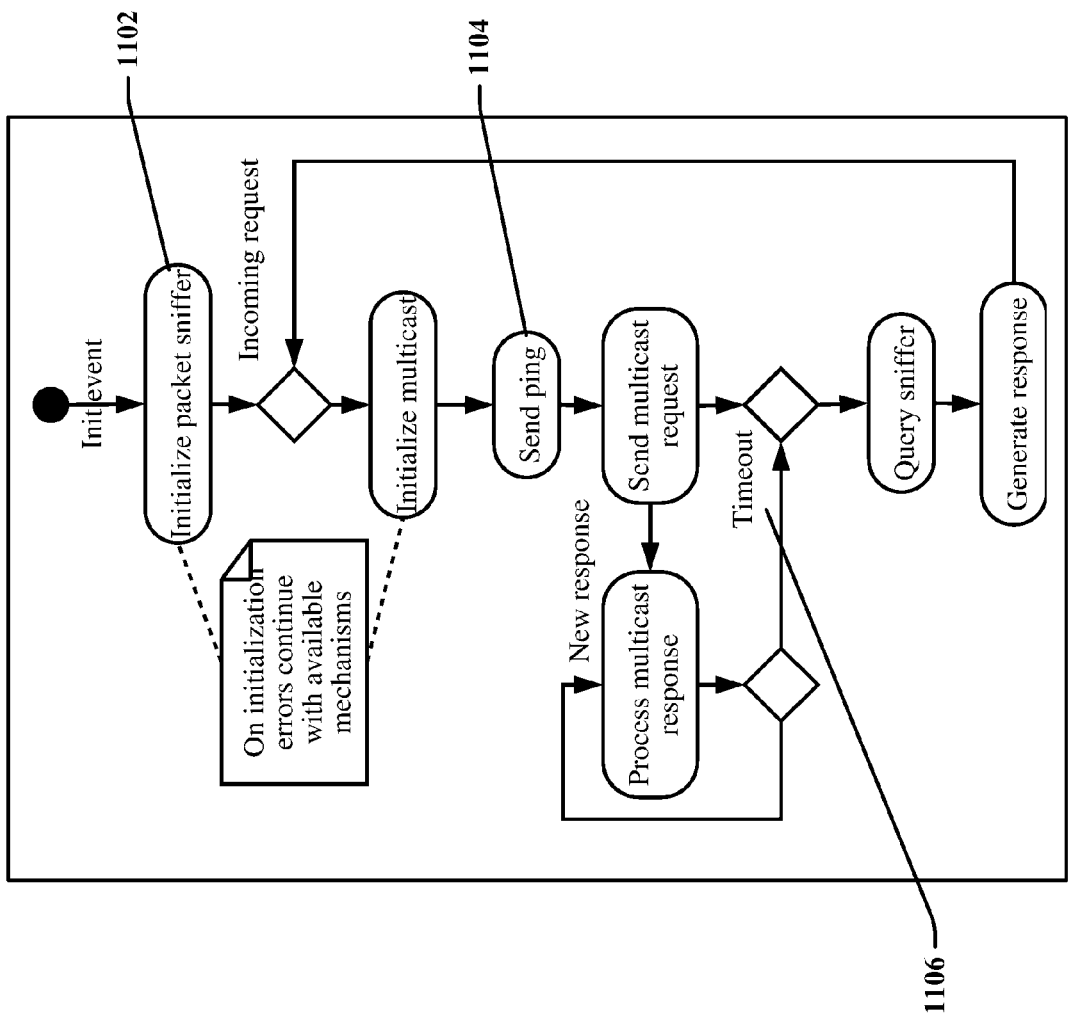
FIG. 11 is an operational sequence diagram for exploring automation networks for automation devices with a configuration web server in accordance with an aspect of an embodiment.

In FIG. 11, an operational sequence diagram 1100 for exploring automation networks to detect automation devices with a configuration web server is shown. The operational sequence diagram 1100 illustrates a combination of techniques to detect as many nodes in an automation network as possible. This combination can be comprised, for example, the following mechanisms: 1) a sniffer, to detect all communicating sources; 2) an Echo request with adjustable single, multicast, and/or broadcast ID, to stimulate currently silent devices, to show a sign of life; and/or 3) a standard compliant component such as, for example, an IEC 61499 specific component, which can be integrated in all compliant devices to easily request their ID via multicast.

Some silent, legacy devices may still not be triggered utilizing the above mechanisms and, thus, not detected. Therefore, specific configuration tools can be included into and/or beside a modular design of a configuration gateway. Referring to FIG. 11, a sniffer 1102 is started at the beginning to continuously run in the background for maintaining a list of devices that showed activity within a predefined time window. A ping 1104 triggers additional nodes to react on request. A timeout 1106 is set for multicast response of devices, which can implement the IEC 61499 extension called 'who-am-I.' This time window determines a deadline for the multicast exploration process; on real-time systems an additional time limit is set for the detection other mechanisms.

Figure 12:
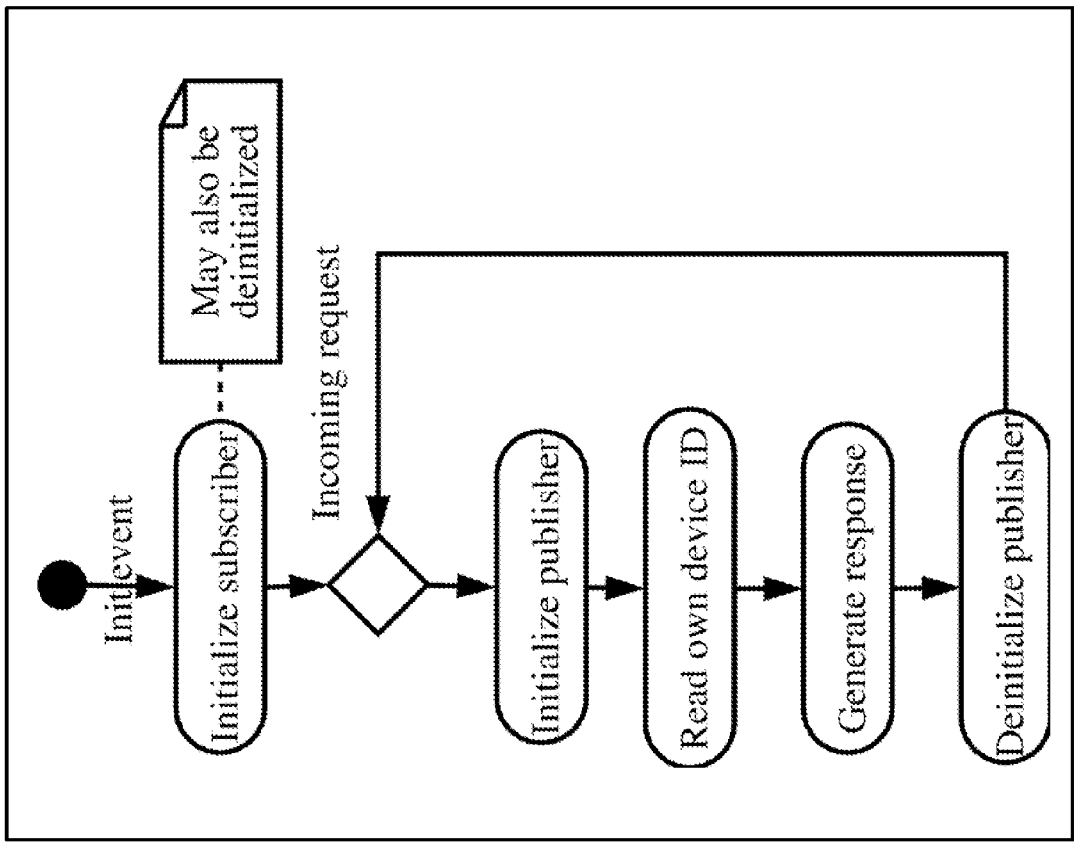
FIG. 12 is an overview process diagram for utilizing a Who-Am-I resource with a configuration web server in accordance with an aspect of an embodiment.

Turning to FIG. 12, an overview process diagram 1200 for utilizing a Who-Am-I resource with a configuration web server is shown. It illustrates a detailed action flow for successful queries used for active multicast detection. It is provided as a resource that can be downloaded into an automation device and executed in the background. The only parameter that needs to be specified is the multicast sub-net identification that is subscribed to receive requests from configuration gateways. Devices can be grouped by using different values for this parameter as identification for the desired groups.

The resource contains only a starting mechanism, communication facilities, and a processing who-am-I master. This allows integrating it even into devices with low system resources. The who-am-I resource can utilize the same XML message format as an instance of a configuration gateway. It accepts requests and uses a provided Multicast_Response_ID as address for the response, which is numbered with the same message-ID as the request. Unknown requests or invalid formats are returned with a Reason parameter, for example, set to "UNSUPPORTED_CMD." As an extension, the who-am-I interface can also be utilized to get silent devices displayed within a configuration applet. A special function block can be programmed to receive the multicast requests and return a static list of all known, project-relevant devices instead of just a known one.

Figure 13:
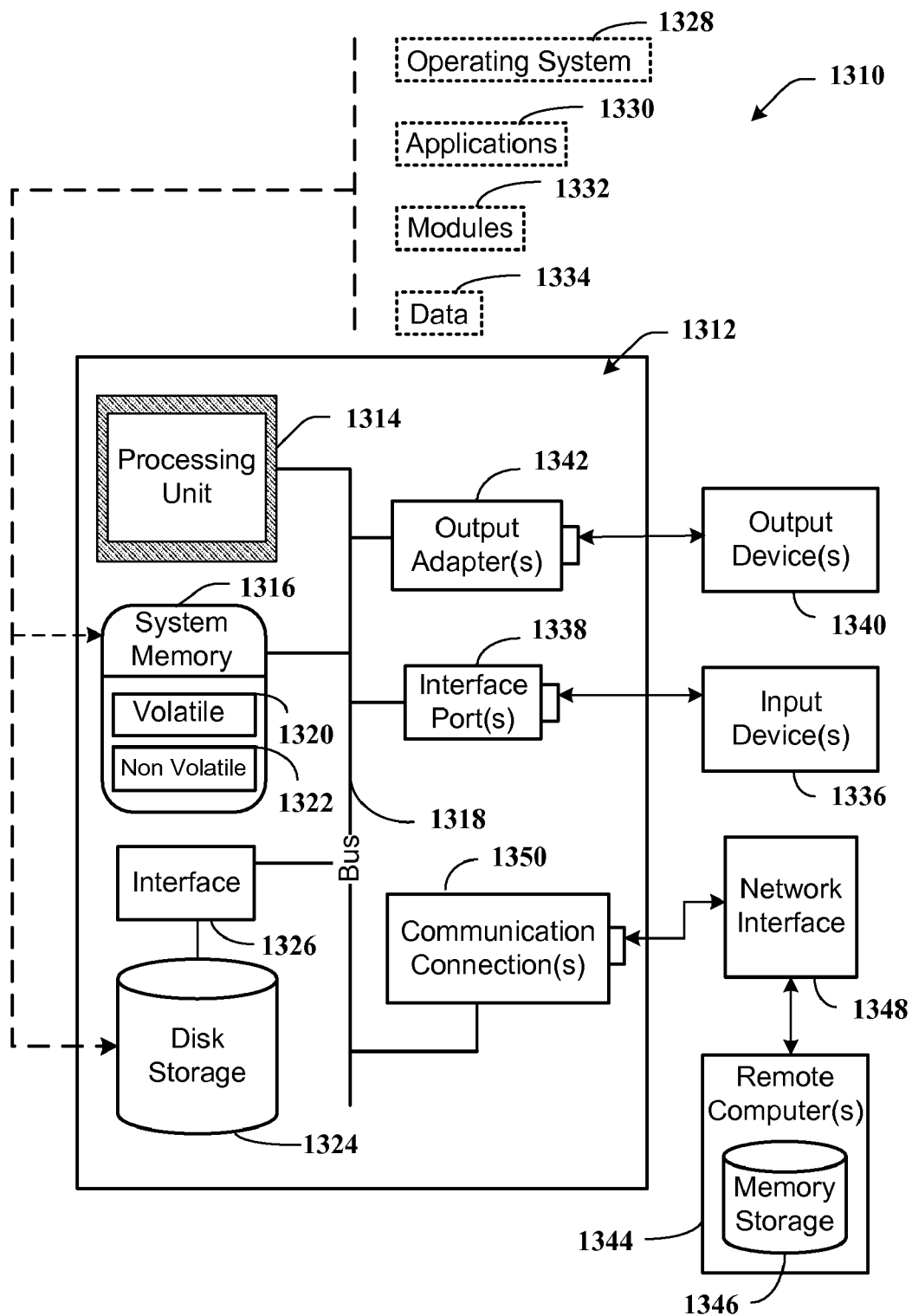
FIG. 13 illustrates an example operating environment in which an embodiment can function.

In order to provide additional context for implementing various aspects of the embodiments, FIG. 13 and the following discussion is intended to provide a brief, general description of a suitable computing environment 1300 in which the various aspects of the embodiments can be implemented. While the embodiments have been described above in the general context of computer-executable instructions of a computer program that runs on a local computer and/or remote computer, those skilled in the art will recognize that the embodiments can also be implemented in combination with other program modules. Generally, program modules include routines, programs, components, data structures, etc., that perform particular tasks and/or implement particular abstract data types. Moreover, those skilled in the art will appreciate that the inventive methods can be practiced with other computer system configurations, including single-processor or multi-processor computer systems, minicomputers, mainframe computers, as well as personal computers, handheld computing devices, microprocessor-based and/or programmable consumer electronics, and the like, each of which can operatively communicate with one or more associated devices. The illustrated aspects of the embodiments can also be practiced in distributed computing environments where certain tasks are performed by remote processing devices that are linked through a communications network. However, some, if not all, aspects of the embodiments can be practiced on stand-alone computers. In a distributed computing environment, program modules can be located in local and/or remote memory storage devices.

As used in this application, the term "component" is intended to refer to a computer-related entity, either hardware, a combination of hardware and software, software, or software in execution. For example, a component can be, but is not limited to, a process running on a processor, a processor, an object, an executable, a thread of execution, a program, and a computer. By way of illustration, an application running on a server and/or the server can be a component. In addition, a component can include one or more subcomponents.

With reference to FIG. 13, an exemplary environment 1310 for implementing various aspects of the invention includes a computer 1312. The computer 1312 includes a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multiprocessor architectures also can be employed as the processing unit 1314.

The system bus 1318 can be any of several types of bus structure(s) including the memory bus or memory controller, a peripheral bus or external bus, and/or a local bus using any variety of available bus architectures including, but not limited to, 16-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1316 includes volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable ROM (EEPROM), or flash memory. Volatile memory 1320 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1312 also includes removable/non-removable, volatile/non-volatile computer storage media. FIG. 13 illustrates, for example, disk storage 1324. Disk storage 1324 includes, but is not limited to, devices like a magnetic disk drive, floppy disk drive, tape drive, Jaz drive, Zip drive, LS-100 drive, flash memory card, or memory stick. In addition, disk storage 1324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1324 to the system bus 1318, a removable or non-removable interface is typically used such as interface 1326.

It is to be appreciated that FIG. 13 describes software that acts as an intermediary between users and the basic computer resources described in suitable operating environment 1310. Such software includes an operating system 1328. Operating system 1328, which can be stored on disk storage 1324, acts to control and allocate resources of the computer system 1312. System applications 1330 take advantage of the management of resources by operating system 1328 through program modules 1332 and program data 1334 stored either in system memory 1316 or on disk storage 1324. It is to be appreciated that the present invention can be implemented with various operating systems or combinations of operating systems.

A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port may be used to provide input to computer 1312 and to output information from computer 1312 to an output device 1340. Output adapter 1342 is provided to illustrate that there are some output devices 1340 like monitors, speakers, and printers, among other output devices 1340 that require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a personal computer, a server, a router, a network PC, a workstation, a microprocessor based appliance, a peer device or other common network node and the like, and typically includes many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1350 refers to the hardware/software employed to connect the network interface 1348 to the bus 1318. While communication connection 1350 is shown for illustrative clarity inside computer 1312, it can also be external to computer 1312. The hardware/software necessary for connection to the network interface 1348 includes, for exemplary purposes only, internal and external technologies such as, modems including regular telephone grade modems, cable modems and DSL modems, ISDN adapters, and Ethernet cards.

Figure 14:
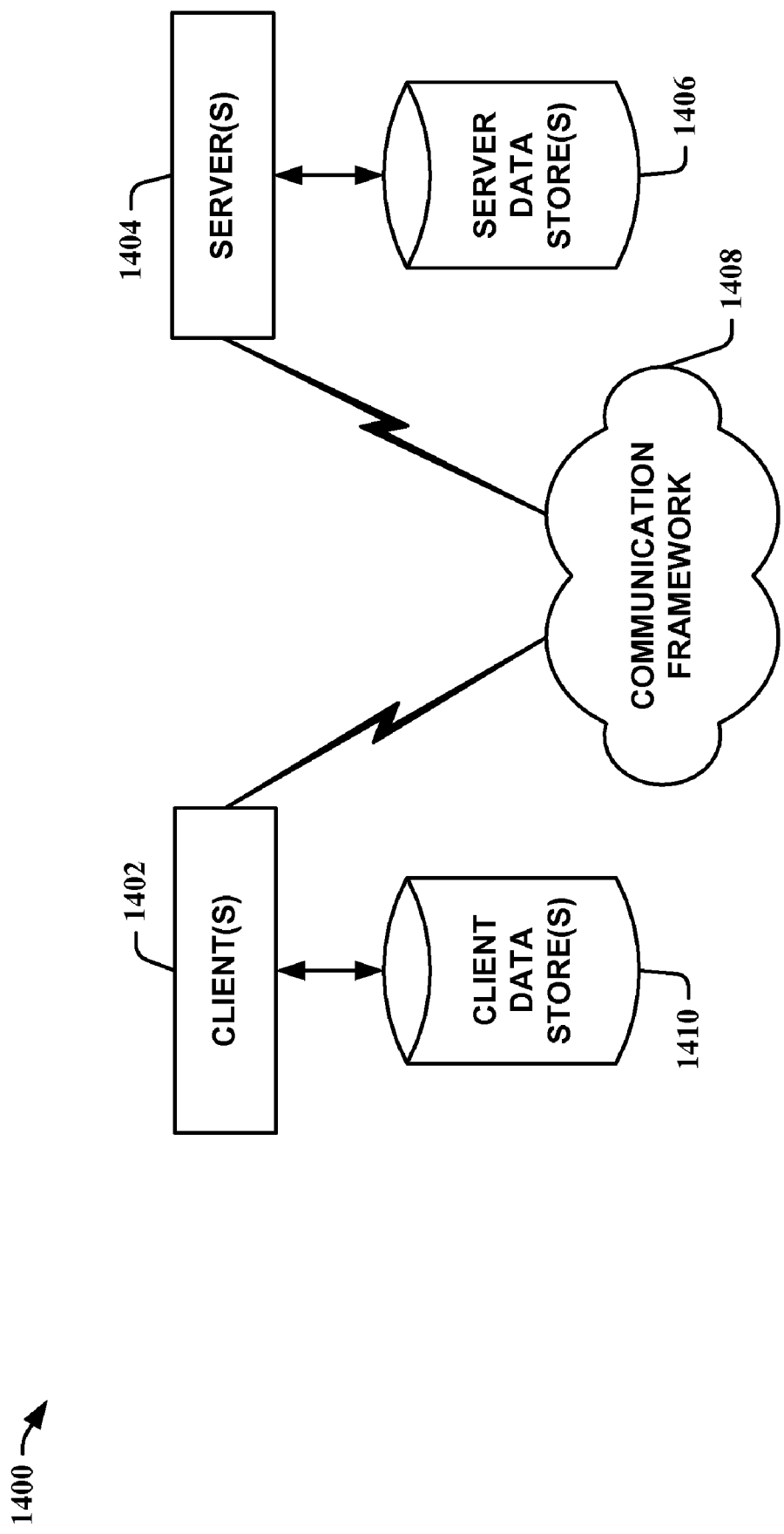
FIG. 14 illustrates another example operating environment in which an embodiment can function.

FIG. 14 is another block diagram of a sample computing environment 1400 with which embodiments can interact. The system 1400 further illustrates a system that includes one or more client(s) 1402. The client(s) 1402 can be hardware and/or software (e.g., threads, processes, computing devices). The system 1400 also includes one or more server(s) 1404. The server(s) 1404 can also be hardware and/or software (e.g., threads, processes, computing devices). One possible communication between a client 1402 and a server 1404 can be in the form of a data packet adapted to be transmitted between two or more computer processes. The system 1400 includes a communication framework 1408 that can be employed to facilitate communications between the client(s) 1402 and the server(s) 1404. The client(s) 1402 are connected to one or more client data store(s) 1410 that can be employed to store information local to the client(s) 1402. Similarly, the server(s) 1404 are connected to one or more server data store(s) 1406 that can be employed to store information local to the server(s) 1404.

In one instance of an embodiment, a data packet transmitted between two or more computer components that facilitates configuration of automation systems is comprised of, at least in part, information routed through a configuration gateway and relayed between a configuration applet running on a web browser and/or an automation device connected to an automation network.

It is to be appreciated that the systems and/or methods of the embodiments can be utilized in automation configuration web server facilitating computer components and non-computer related components alike. Further, those skilled in the art will recognize that the systems and/or methods of the embodiments are employable in a vast array of electronic related technologies, including, but not limited to, computers, servers and/or handheld electronic devices, and the like.

What has been described above includes examples of the embodiments. It is, of course, not possible to describe every conceivable combination of components or methodologies for purposes of describing the embodiments, but one of ordinary skill in the art may recognize that many further combinations and permutations of the embodiments are possible. Accordingly, the subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates configuration of automation control systems, comprising:
 a processor;
 a memory communicatively coupled to the processor, the memory having stored therein computer-executable instructions configured to implement the system, including:
  a web server configured to provide an interface via a web browser to at least one computing device,
  wherein the web server is further configured to instantiate multiple configuration gateways on the web server that respectively provide a pathway for communication between at least two interconnected automation networks, wherein the interface is configured to interact, through the multiple configuration gateways, with the at least two interconnected automation networks to provide detection of and communication with at least two devices on the respective at least two automation networks,
wherein the web server is further configured to download, to at least one device of the at least two devices, a who-am-I resource that executes on the at least one device and provides identification information employed by the web server to display the at least one device within the web browser, and
wherein the web server is configured to interact with the who-am-I resource using at least one of multicast detection, a sniffer, or an echo request to retrieve the identification information.

2. The system of claim 1, wherein the multiple configuration gateways are configured to interact with standard International Electrotechnical Commission (IEC) 61499 compliant devices and devices that are not IEC 61499 compliant.

3. The system of claim 1, wherein the multiple configuration gateways are configured to allow a topology of the at least two interconnected automation networks to be explored via the web browser.

4. The system of claim 1, wherein the multiple configuration gateways provide a single access point between the at least two interconnected automation networks and the at least one computing device.

5. The system of claim 1, wherein at least one of the multiple configuration gateways is configured to employ the sniffer to detect a passive device, the echo request to stimulate and detect silent devices, or an identification request to detect International Electrotechnical Commission (IEC) 61499 compliant devices.

6. The system of claim 1, wherein at least one of the multiple configuration gateways is configured to interact with the who-am-I resource in the at least one device for active multicast detection of the at least one device.

7. The system of claim 1, wherein at least one of the multiple configuration gateways is configured to interact with heterogeneous automation networks.

8. The system of claim 1, wherein the web server is configured to create additional configuration gateways that interact with additional automation networks to detect and communicate with automation devices on the additional automation networks.

9. The system of claim 8, wherein the additional configuration gateways are configured to explore topologies of the additional automation networks.

10. The system of claim 1, wherein the interface comprises a hyper-text markup language (HTML) web page for the web browser.

11. The system of claim 10, wherein the interface comprises a configuration applet that operates in the web browser.

12. The system of claim 11, wherein the configuration applet interacts with the multiple configuration gateways to configure at least one of the at least two devices.

13. The system of claim 1, wherein the multiple configuration gateways are based on an open standard for engineering platforms.

14. The system of claim 13, wherein the open standard is an International Electrotechnical Commission (IEC) 61499 compatible standard.

15. A method for configuring automation control systems, comprising:
employing a processor executing computer-executable instructions stored on a computer-readable storage medium to implement the following acts:
serving, from a configuration web server to at least one computing device, a self-contained software application for configuring automation network devices via a web browser;
detecting and communicating with a first device in a first automation network via a first gateway instantiated on the configuration web server by the self-contained software application;
instantiating a second gateway on the configuration web server for interacting with the self-contained software application and a second automation network;
downloading a who-am-I resource from the configuration web server to a second device in the second automation network;
retrieving identification information for the second device from the who-am-I resource using at least one of multicast detection, a sniffer, or an echo request;
employing the identification information to display the second device on the self-contained software application; and
detecting and communicating with the second device in the second automation network via the second gateway using the self-contained software application.

16. The method of claim 15, further comprising:
actively or passively exploring the first automation network or the second automation network via the self-contained software application; and
discovering at least one of the first device or the second device via the exploring.

17. The method of claim 15, wherein the downloading comprises downloading the who-am-I resource to an International Electrotechnical Commission (IEC) 61499 compliant device.

18. The method of claim 15, further comprising implementing a security layer in at least one of the first gateway or the second gateway to restrict unauthorized access to the first automation network or the second automation network.

19. The method of claim 15, further comprising providing additional separate interactions to the first automation network or the second automation network for respective additional self-contained software applications.

20. The method of claim 15, further comprising providing the self-contained software application in a hyper-text markup language (HTML) web page for the web browser.

21. The method of claim 15, further comprising basing the first gateway and the second gateway on an International Electrotechnical Commission (IEC) 61499 compatible standard.

22. A non-transitory computer-readable medium having stored thereon computer-executable instructions that, in response to execution by a computer, direct the computer to:
serve a software applet from a configuration web server to a web browser window on at least one computing device, the software applet acting as an interface with at least one automation device residing on a topology of multiple interconnected automation networks;
maintain multiple gateways on the configuration web server, the multiple gateways respectively acting as communication links between the software applet and a disparate automation network within the topology;
download a who-am-I resource to the at least one automation device;
retrieve an identification for the at least one automation device from the who-am-I resource using at least one of multicast detection, a sniffer, or an echo request;
employ the identification to display the at least one automation device on the software applet; and
interface the software applet with the at least one automation device via the multiple gateways to control the at least one automation device via the software applet.

* * * * *